March 17, 1953 F. GRAY 2,632,058

PULSE CODE COMMUNICATION

Filed Nov. 13, 1947 4 Sheets-Sheet 1

INVENTOR
F. GRAY
BY Harry C. Hart
ATTORNEY

March 17, 1953 F. GRAY 2,632,058

PULSE CODE COMMUNICATION

Filed Nov. 13, 1947 4 Sheets-Sheet 2

FIG. 2 REFLECTED BINARY CODING MASK

FIG. 2A CONVENTIONAL BINARY CODING MASK (PRIOR ART)

INVENTOR
F. GRAY
BY Harry C. Hart
ATTORNEY

March 17, 1953 F. GRAY 2,632,058

PULSE CODE COMMUNICATION

Filed Nov. 13, 1947 4 Sheets-Sheet 3

INVENTOR
F. GRAY
BY
Harry C. Hart
ATTORNEY

March 17, 1953 F. GRAY 2,632,058

PULSE CODE COMMUNICATION

Filed Nov. 13, 1947 4 Sheets-Sheet 4

INVENTOR
F. GRAY
BY
Harry C. Hart
ATTORNEY

Patented Mar. 17, 1953 2,632,058

UNITED STATES PATENT OFFICE 2,632,058

PULSE CODE COMMUNICATION

Frank Gray, East Orange, N. J., assignor to Bell Telephone Laboratories, Incorporated, New York, N. Y., a corporation of New York Application November 13, 1947, Serial No. 785,697

16 Claims. (Cl. 179—15)

This invention relates to pulse code transmission and particularly to the coding of a message signal in a novel code and to the decoding thereof.

In communication by pulse code transmissions the instantaneous amplitudes of a message to be transmitted are successively sampled and each of the successive samples is translated into a code group of on-or-off pulses. By reason of the on-or-off character of the pulses, such a code is denoted a binary code. The number of pulse positions in a code group is the same from group to group. With five such positions the code is a 5-digit binary code. With seven it is a 7-digit binary code; and in general, with $n$ such positions it is an $n$-digit binary code. A code pulse group of $n$ pulse positions may contain any number, from 0 to $n$, of "on" pulses. In the conventional $n$-digit binary code, the number and arrangement of pulses is in accordance with the conventional binary number notation. Thus, for example, with three digits, the number five is written in the conventional binary number notation as 101. Correspondingly, in the conventional 3-digit binary pulse code, the pulses occur in the time sequence P, —, P, where "P" stands for an "on" pulse and "—" stands for an "off" pulse; i. e., a blank pulse position.

In Italian Patent 437,300, published June 30, 1948, there is described an instrument for translating message signal samples into code pulse groups in the conventional binary code. In brief, it comprises a cathode beam tube having a coding mask, an electron gun for projecting an electron beam toward the mask, a collector anode for receiving electrons which pass through the mask and deriving pulses from them, means for deflecting the cathode beam in one direction along the mask to a location proportional to the signal sample amplitude, and means for sweeping the beam in a perpendicular direction across the mask between successive sample-controlled deflections. As currently employed, the mask comprises a rectangular array of apertures arranged in $n$ columns and $2^n$ rows, where $n$ is the number of digits of the code. Each aperture row corresponds to a unique value of the signal-controlled beam deflection. The apertures of the various rows are located in conformity with the location of the 1's in a tabulation of successive binary numbers, while the blank portions of the mask are located in conformity with the 0's in the same tabulation. Thus, when the cathode beam is deflected under control of the signal to a particular aperture row and thereupon swept laterally along this row, a train of current pulses may be drawn from the collector whose location on the time scale is in accordance with the arrangement of the 1's and 0's in the binary number whose value is equal to the value of the signal sample being coded.

It is a characteristic of the conventional binary number notation that a value change of unity may be reflected in the binary number notation by a simultaneous change in several of the digits. Thus, for example, with four digits the number seven is represented by 0111 while the next number, eight, is represented by 1000. In the course of changing the value by one unit, each of the four digits has been changed.

This characteristic of the conventional binary number notation is duplicated in the coding mask of the Italian patent above referred to, and it is a consequence of the resulting arrangement of the apertures that a wander of the beam in the course of its lateral sweep from the correct aperture row to the row immediately above or below it, may result in a coding error which is far greater than the beam deflection error. Various arrangements have been suggested for reducing this coding error by constraining the cathode beam to start its sweep at the correct row and to remain there throughout the sweep. Arrangements of this kind are described in articles published in the Bell System Technical Journal for January 1948, vol. 27, pages 1 and 44, which describe the coding tube, in detail. Individual features of the apparatus are claimed in Patent 2,458,652, issued January 11, 1949, to R. W. Sears; Patent 2,463,535, issued March 8, 1948, to G. Hecht; and in Patent 2,473,691, issued June 21, 1949, to L. A. Meacham. All such arrangements involve complexity of apparatus in various degrees.

It is a principal object of the present invention to reduce the coding errors in a pulse code transmission system. A more specific object is to provide a pulse code, and a corresponding coding mask, in which the coding error is never greater than the beam deflection error.

Another object is to simplify the manufacture of a coding mask.

The above objects are attained in accordance with the invention by the selection of a novel form of the binary pulse code which differs from the conventional form by virtue of a rearrangement of the pulses of the various pulse groups in such a way that the sequence of "on"-pulses and "off"-pulses which form a pulse group representing a particular signal amplitude differs in only one pulse position from the sequences representing the next lower amplitude and next higher amplitude. The new code is no longer similar to the accepted binary number notation. When it is embodied in a coding mask, the arrangement of the apertures of any one row differs from that of the rows above and below it in not more than one aperture. The resulting mask has certain valuable auxilary properties and aspects. First, the smallest apertures, that is to say the apertures of the various rows in the column of least digital significance, are twice as large as the apertures of the conventional binary code mask. This makes for ease of manufacture. Second, all of the apertures of the mask, with the sole exception of the single aperture of greatest digital significance, are symmetrically arranged about a transverse center line. This permits treating the largest digit aperture as an index of polarity only, rectifying the wave to be coded, sampling the rectified wave, and coding the samples using only one half of the coding mask. At the price of some increased complexity of associated apparatus, this greatly reduces the physical dimensions of the coder tube itself. Third, for signals of normal average amplitude range, the beam deflections seldom extend beyond the aperture of the column of second greatest digital significance, so that in the resulting coded signal, the $(n-1)^{th}$ pulse position is nearly always fillted. This uniformly filled pulse position affords a convenient source of marker pulses for use in holding a receiver in correct synchronism with the transmitter.

Accordingly, it is a subsidiary object of the invention to provide a pulse code into which auxiliary information may be interleaved without placing increased demands on the transmission band and without degrading the quality of the received signal.

The binary code with which the present invention deals may take various forms, all of which have the property that the symbol (or pulse group) representing each number (or signal amplitude) differs from the ones representing the next lower and the next higher number (or signal amplitude) in only one digit (or pulse position). Because this code in its primary form may be built up from the conventional binary code by a sort of reflection process and because other forms may in turn be built up from the primary form in similar fashion, the code in question, which has as yet no recognized name, is designated in this specification and in the claims as the "reflected binary code."

If, at a receiver station, reflected binary code pulses were to be applied to decoding apparatus designed to translate conventional binary code pulses, the result would be incomprehensible. Accordingly, a related object is to translate incoming reflected binary code pulse groups at a receiver station into message signal samples for reproduction. An alternative object is to translate incoming reflected binary code pulse groups into pulse groups of the conventional binary pulse code, whereupon the latter may be translated into message signal samples for reproduction by conventional means.

The reflected binary code may take many forms, all of which have the property that no number differs from its neighbor's in more than one digit. The various secondary forms may be derived from the primary one by interchanging columns, by cutting the tabulation at any horizontal line and placing the upper part below the lower one; by changing all the 1's of any column to 0's and all the 0's to 1's; by construction from the conventional binary code by a modification of the reflection process, and so on. Some of these forms offer special advantages over others. The coding of signals into them presents no additional problem. The decod ng can be carried out in various ways by suitable adaptations of the decoding apparatus and processes described below in detail for the reflected binary code in its primary form.

The invention will be fully apprehended from the following detailed description of preferred embodiments thereof, taken in conjunction with the appended drawings in which.

Figure 1:
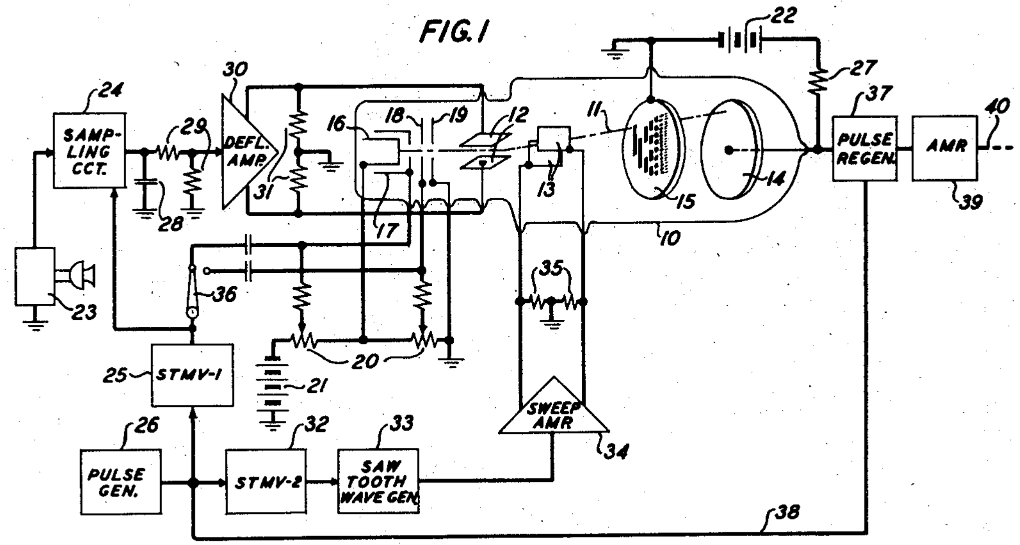
Fig. 1 is a schematic diagram of coding apparatus in accordance with the invention.

Referring now to the drawings, Fig. 1 shows a coder device for translating a voice wave or other message signal into binary code pulses. The basic features of the apparatus, which are described in the Bell System Technical Journal publications above referred to, comprise a cathode beam tube 10 including an electron gun for projecting a cathode beam 11, vertical deflection plates 12 to which the signal to be coded is applied, horizontal deflection plates 13 for sweeping the beam in a perpendicular direction, a collector anode 14 and a coding mask 15. The electron gun 11 may comprise a cathode 16, a control electrode or grid 17, a focussing electrode 18 and an accelerating electrode 19. These electrodes may be supplied with operating potentials by connection to a voltage divider 20, energized by a source 21 in conventional fashion. Operating potentials may be applied to the collector anode 14, from another source 22 while the coding mask 15 may be connected to ground.

In operation, a signal to be coded, for example a voice message originating at a source 23, is repeatedly sampled by a sampling circuit 24 under control of a single trip multivibrator 25 which delivers short square pulses at the sampling frequency. The latter is in turn controlled by a basic timing circuit or pulse frequency generator 26. Each speech sample, after being taken, is stored on a storage condenser 28 for use in the coding device until the arrival of a new sample. The resulting voltage on the storage condenser is applied by way of a voltage divider 29 to a vertical deflection amplifier 30 whose output may be balanced to ground by way of a center-tapped resistor 31 and applied to the vertical deflection plates 12. The pulse generator 26 also controls a second single trip multivibrator 32 delivering square pulses of somewhat greater duration than those of the first single trip multivibrator 25. These, in turn, control a sawtooth wave generator 33 delivering a sawtooth voltage to a sweep amplifier 34 whose output, balanced to ground by way of a center-tapped resistor 35, is applied to the horizontal deflection plates 13. Thus, after vertical deflection of the cathode beam 11 to a desired position at the beginning of a particular aperture row of the coding mask 15 by the application of a signal sample to the vertical deflection amplifier 30, the beam 11 is swept in a horizontal direction along this aperture row to deliver a sequence of current pulses at the collector 14 and therefore of voltage pulses across the output loading resistor 27. By proper arrangement of the apertures in the coding mask 15 in accordance with the teachings of the Bell System Technical Journal publications above referred to, these pulses constitute a conventional binary code group of a number of digits or pulse positions equal to the number of columns of apertures in the mask. As a practical matter, it has been found that a 7-digit binary code produced by a mask having seven columns of apertures and $2^7$ or 128 rows, gives ample fidelity in reproduction. The beam 11 may be blanked or defocussed during the return sweep by application of pulses from the multivibrator 25 to the electrodes, 18 or 19, selection being made by a switch 36.

Figures 2, 2A:
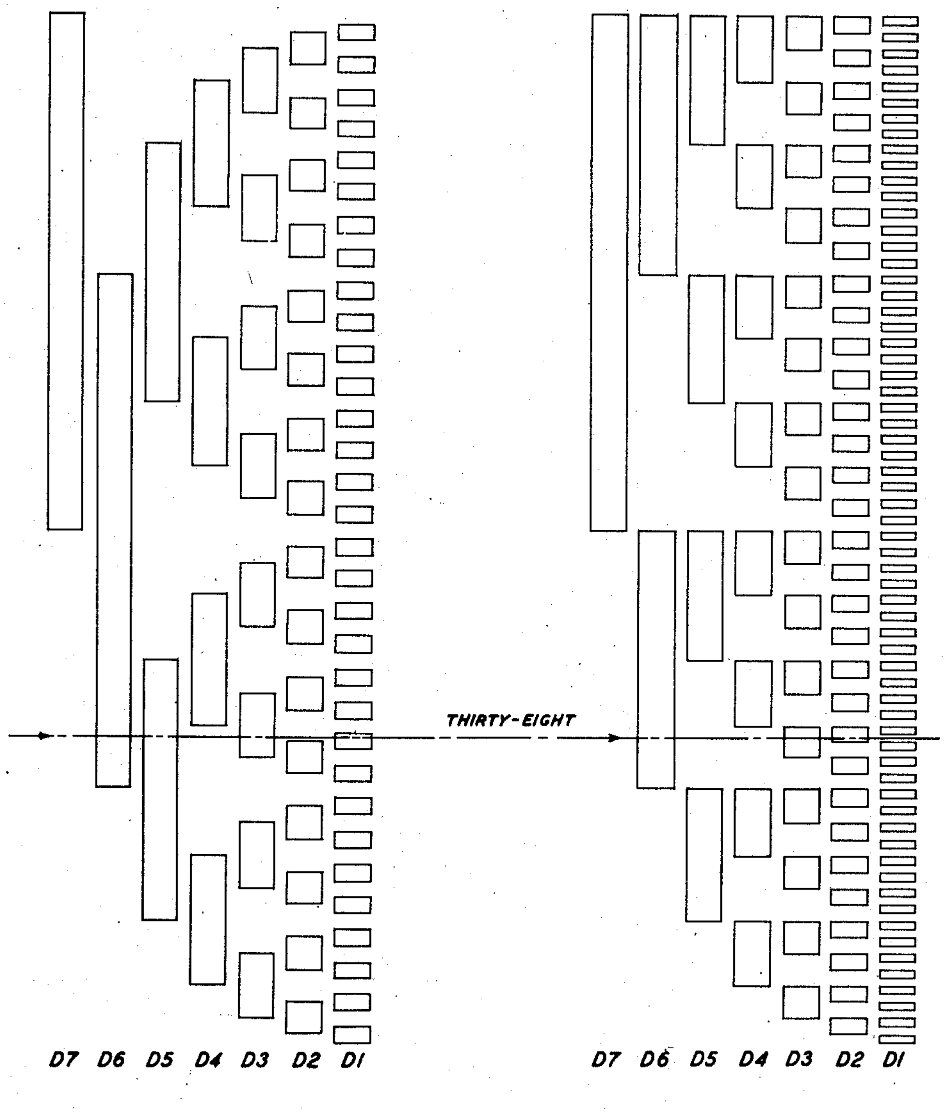
Fig. 2 is an end view of the coding mask of Fig. 1 drawn to an enlarged scale.
Fig. 2A is a similar view of a conventional coding mask.

Fig. 2 shows an end view of a coding mask in which the apertures are arranged to produce reflected binary code pulses in the output circuit from the collector anode of the tube 10. Fig. 2A shows the conventional 7-digit binary coding mask for comparison. The masks of Fig. 2 and Fig. 2A are for 7-digit codes. It will be shown below how the aperture arrangement of a 2-digit reflected binary coding mask can be built up from the aperture arrangement of a 1-digit mask, that of a 3-digit mask from a 2-digit mask, and so on, until the 7-digit mask is arrived at. In Fig. 2, all of the apertures are symmetrically arranged with respect to a horizontal center line with the sole exception of the single aperture which fills the upper half of the seventh column. The two large apertures of the fifth column are each half as large as the one large aperture of the sixth column and their centers lie immediately opposite its ends. The four apertures of the fourth column are each one half as large as the apertures of the fifth column and their centers lie immediately opposite their ends. The same pattern of symmetry holds for the apertures of each column of lower digital significance. Thus with the sole exception of the seventh column, the lower half of the mask is an image of the upper half as reflected in a central transverse axis.

Comparison of Fig. 2 with Fig. 2A reveals at once that the apertures of lowest digital significance are twice as large in the reflected binary coding mask as they are in the conventional binary coding mask. This simplifies fabrication. Inspection of Fig. 2 also reveals that in the sixth column, the single large aperture extends half way to the foot and to the head, respectively, of the mask. Therefore, when signals of low amplitude are coded, the corresponding pulse position is nearly always filled, and the resulting nearly regular sequence of sixth digit pulses may be used, if desired, for the transmission of auxiliary synchronizing information.

The manner in which the primary reflected binary number system is built up will now be explained.

First: write down the first two numbers in the 1-digit orthodox binary number system, thus:

| | |
|---|---|
| Zero | 0 |
| One | 1 |

Note that the symbols differ in only one digit.

Second: below this array write its "reflection" in a transverse axis:

| | |
|---|---|
| Zero | 0 |
| One | 1 |
| | ------ |
| | 1 |
| | 0 |

The symbols still differ in not more than one digit. However, the first is identical with the fourth and the second with the third.

Third: to remove this ambiguity, add a second digit to the left of each symbol, 0 for the first two symbols and 1 for the last two, thus:

| | |
|---|---|
| Zero | 00 |
| One | 01 |
| Two | 11 |
| Three | 10 |

and identify the last two symbols with the numbers "two" and "three." Each symbol is now unique and differs from those above and below it in not more than one digit. The array is a representation of the first four numbers in the primary 2-digit reflected binary number system.

The process is next repeated, giving—

First:

| | |
|---|---|
| Zero | 00 |
| One | 01 |
| Two | 11 |
| Three | 10 |

Second:

| | |
|---|---|
| Zero | 00 |
| One | 01 |
| Two | 11 |
| Three | 10 |
| | ------ |
| | 10 |
| | 11 |
| | 01 |
| | 00 |

Third:

| | |
|---|---|
| Zero | 000 |
| One | 001 |
| Two | 011 |
| Three | 010 |
| Four | 110 |
| Five | 111 |
| Six | 101 |
| Seven | 100 |

In going from the conventional binary number system to the binary pulse code, it has been customary to employ "on" pulses for the 1's and "off" pulses or blank pulse positions for the 0's. The same convention is employed in the construction of the primary reflected binary coding mask. Thus, for example, in the primary 7-digit reflected binary number system, the number 38 is written:

Thirty-eight=0110101 and the corresponding reflected binary code pulse group is

—, P, P, —, P, —, P where "—" stands for a blank pulse position and "P" stands for an "on" pulse.

It is, of course, equally possible to identify "off" pulses with 1's and "on" pulses with 0's, which would give, instead, one of the secondary forms

P, —, —, P, —, P, —

Other secondary forms of the reflected binary code may be obtained in various ways. Vertical columns may be interchanged. For any such transposition the pattern may be split along any horizontal division line between rows, and the lower part placed above the upper part, to give a new pattern with the same properties as the primary one. Again, the initial process of building up the code by reflection may be modified, giving two alternatives for the 1-digit code, four for the 2-digit code, and so on. The four alternatives for the 2-digit code are tabulated below. Of these the first is the primary one discussed above, the others being variants.

| Number | Primary | First Variant | Second Variant | Third Variant |
|---|---|---|---|---|
| Zero | 00 | 10 | 01 | 11 |
| One | 01 | 11 | 00 | 10 |
| Two | 11 | 01 | 10 | 00 |
| Three | 10 | 00 | 11 | 01 |

For illustrative purposes, the primary reflected binary code will henceforth be adhered to.

Returning to Fig. 1, whenever the electron beam 11 passes through an aperture of the mask 15, it strikes the collector anode 14 and gives rise to a current pulse in the output conductor and to a voltage pulse across the loading resistor 27 and on the outgoing line 40. Because these pulses are due to electron current they are negative in sign. Furthermore, they may be degraded in various ways and for various causes. Before transmission they are preferably regenerated, for example, by a gater-slicer circuit which may be of the type described in the Bell System Technical Journal publications above referred to. To this end a pulse regenerator circuit 37 is shown schematically and it is supplied by way of a conductor 38 with gating pulses originating in the basic pulse generator.

The pulses as thus regenerated are still negative in sign and may be transmitted in that condition. However, to facilitate the description of the receiver apparatus, it is preferred to invert the pulses in polarity, thus rendering them all positive in voltage. This may be accomplished in any convenient way, for example, by an amplifier 39.

At the receiver station, the incoming signal is amplified and demodulated as required, by means not shown, to recover reflected binary code pulses. These are now to be translated into message signal samples for reproduction, either directly or by preliminary translation into conventional binary code and decoding the latter by conventional methods and means.

The formulae which, for any number, relate symbols in the reflected binary number rotation to the symbols in the conventional notation are as follows: Let $C_1, C_2, C_3 \ldots C_7 \ldots C_n$ represent the coefficients of the several digits in the conventional notation. Let $R_1, R_2, R_3 \ldots R_7 \ldots R_n$ represent the coefficients of the several digits in the reflected binary notation. Since both notations are binary, each R and each C may have the value 1 or the value 0, but no others. Then, for any number, $$\left.\begin{array}{lll}
C_n & = R_n & (\text{Mod. } 2) \\
C_{n-1} & = R_n + R_{n-1} & (\text{Mod. } 2) \\
\vdots & \vdots & \\
C_7 & = R_n + R_{n-1} \ldots R_7 & (\text{Mod. } 2) \\
C_6 & = R_n + R_{n-1} \ldots R_7 + R_6 & (\text{Mod. } 2) \\
C_5 & = \ldots R_7 + R_6 + R_5 & (\text{Mod. } 2) \\
C_4 & = \ldots R_7 + R_6 + R_5 + R_4 & (\text{Mod. } 2) \\
C_3 & = \ldots R_7 + R_6 + R_5 + R_4 + R_3 & (\text{Mod. } 2) \\
C_2 & = \ldots R_7 + R_6 + R_5 + R_4 + R_3 + R_2 & (\text{Mod. } 2) \\
C_1 & = \ldots R_7 + R_6 + R_5 + R_4 + R_3 + R_2 + R_1 & (\text{Mod. } 2)
\end{array}\right] \quad (1)$$

The formulae for converting from the conventional notation to the reflected notation are $$\left.\begin{array}{lll}
R_n & = C_n & (\text{Mod. } 2) \\
R_{n-1} & = C_n + C_{n-1} & (\text{Mod. } 2) \\
\vdots & \vdots & \\
R_7 & = C_8 + C_7 & (\text{Mod. } 2) \\
R_6 & = C_7 + C_6 & (\text{Mod. } 2) \\
R_5 & = C_6 + C_5 & (\text{Mod. } 2) \\
R_4 & = C_5 + C_4 & (\text{Mod. } 2) \\
R_3 & = C_4 + C_3 & (\text{Mod. } 2) \\
R_2 & = C_3 + C_2 & (\text{Mod. } 2) \\
R_1 & = C_2 + C_1 & (\text{Mod. } 2)
\end{array}\right] \quad (2)$$

In both sets of formulae, the proviso "Mod. 2" means that all even sums are written "0" and all odd sums are written "1."

The foregoing general formulae are evidently reduced to those for 7-digit codes merely by noting that, for seven digits, $R_8 \ldots R_n$ and $C_8 \ldots C_n$ are zero.

As is well known, the value of a number is obtained from its representation in the conventional code by weighting the various C's in proportion to $2^{d-1}$, where $d$ is the digit number, and adding the results. Thus, for the number thirty-eight, which in the 7-digit conventional binary code is written: Thirty-eight = 0100110, $$\left.\begin{array}{l}
C_7(=0)\times 2^6 = \text{Zero} \\
C_6(=1)\times 2^5 = \text{Thirty-two} \\
C_5(=0)\times 2^4 = \text{Zero} \\
C_4(=0)\times 2^3 = \text{Zero} \\
C_3(=1)\times 2^2 = \text{Four} \\
C_2(=1)\times 2^1 = \text{Two} \\
C_1(=0)\times 2^0 = \text{Zero}
\end{array}\right] \quad (3)$$

Thirty-eight

Applicant has discovered that a number may be obtained from its representation in the reflected binary code in its primary form by a related but different process, namely, by (*a*) weighting the various R's in proportion to $2^{d-1}$, (*b*) changing the signs of alternate non-zero R's, starting with the second, and (*c*) adding the results. The second step is equivalent to multiplying by $(-1)^S$, where S is the number of non-zero digits in the symbol with digit numbers greater than $d$. Thus, for the number thirty-eight, which in the 7-digit reflected binary code is written: Thirty-eight=0110101.

$$\left.\begin{array}{l} R_7(=0)\times(2^7-1)\times(-1)^0=\text{Zero} \\ R_6(=1)\times(2^6-1)\times(-1)^0=+\text{Sixty-three} \\ R_5(=1)\times(2^5-1)\times(-1)^1=-\text{Thirty-one} \\ R_4(=0)\times(2^4-1)\times(-1)^2=\text{Zero} \\ R_3(=1)\times(2^3-1)\times(-1)^2=+\text{Seven} \\ R_2(=0)\times(2^2-1)\times(-1)^3=\text{Zero} \\ R_1(=1)\times(2^1-1)\times(-1)^3=-\text{One} \end{array}\right] \quad (4)$$

$$\text{Thirty-eight}$$

Figure 3:
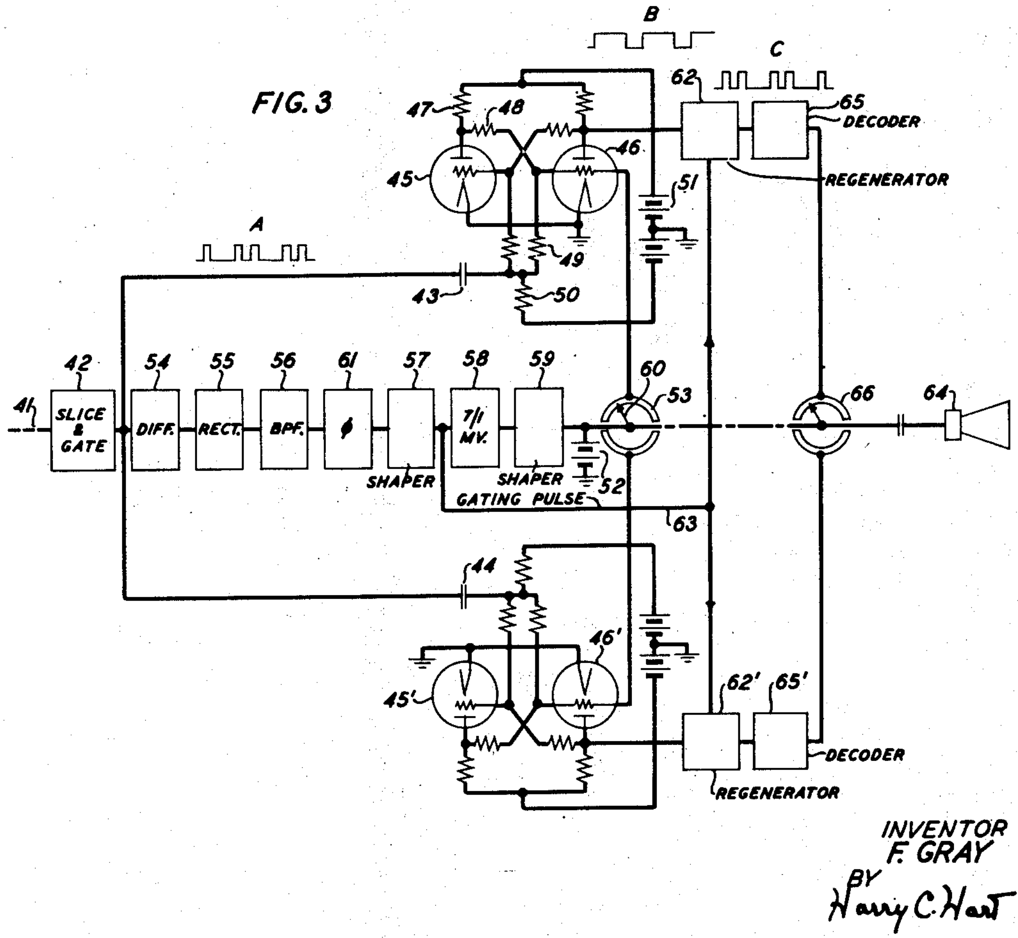
Fig. 3 is a schematic circuit diagram of apparatus for translating incoming reflected binary code pulse groups into conventional binary code pulse groups and for decoding the latter and reproducing the decoded values as a signal.
Figure 4:
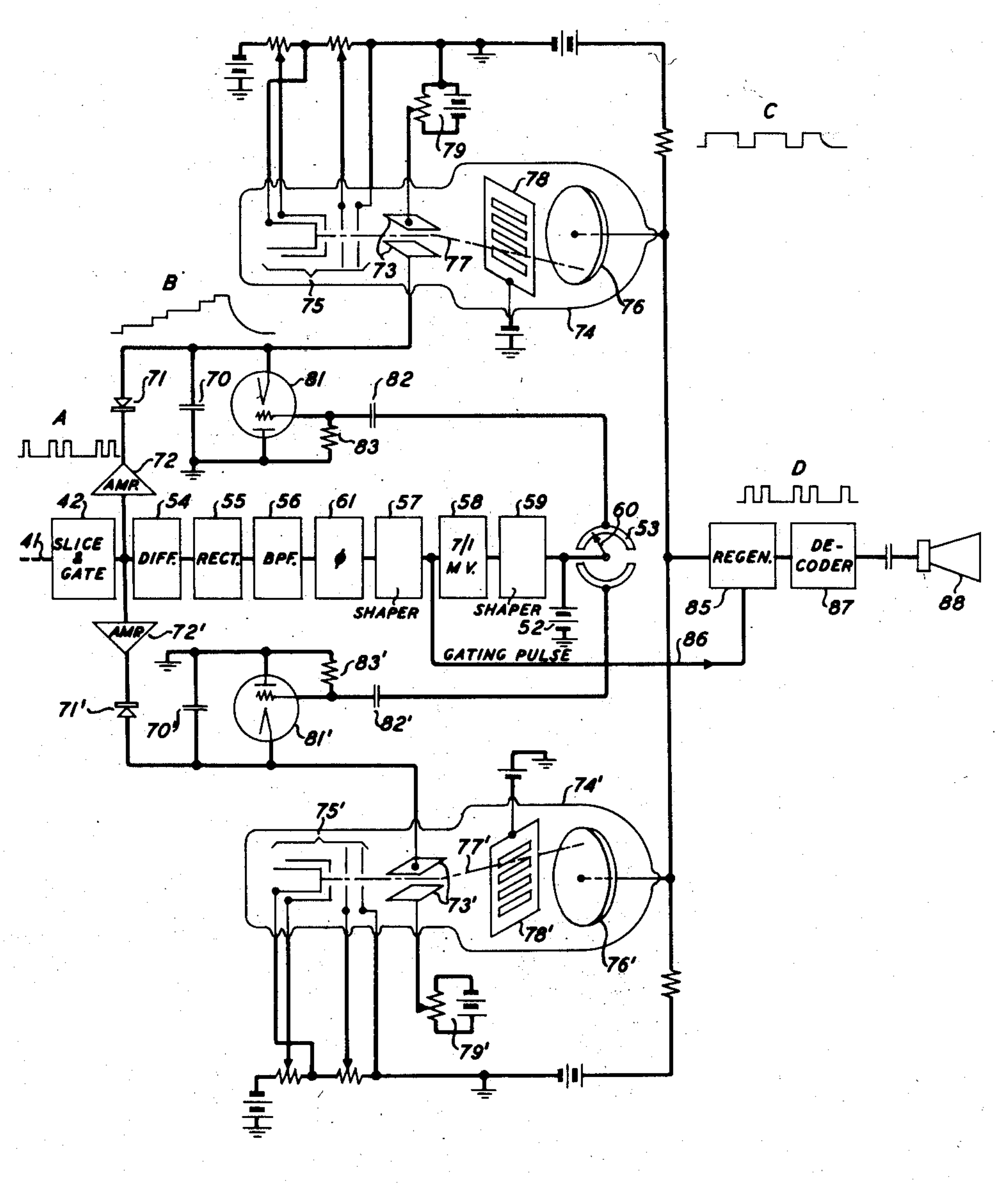
Fig. 4 is a schematic circuit diagram of an alternative to Fig. 3.
Figure 5:
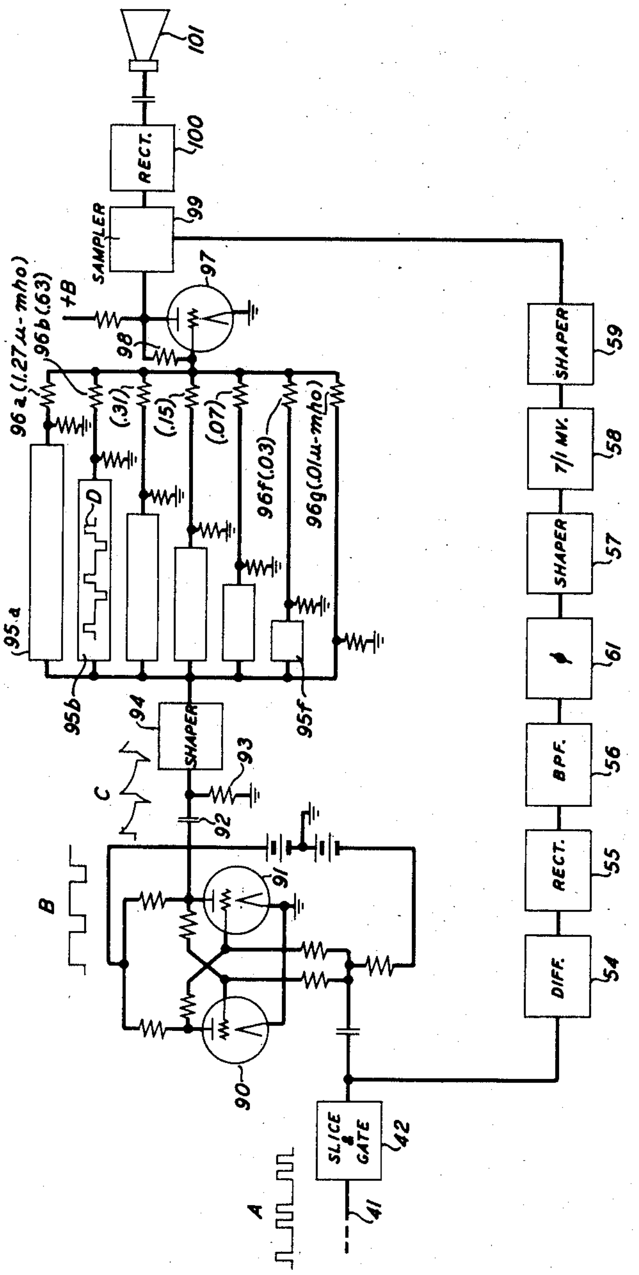
Fig. 5 is a schematic circuit diagram of apparatus for translating incoming reflected binary code pulse groups directly into signal samples for reproduction, without carrying out the intermediate step of translating into conventional binary code.

Figs. 3 and 4 show alternative forms of receiver apparatus in which incoming reflected binary code pulse groups are first transformed into conventional binary code groups by realization of the Formula 1, whereupon the resulting conventional binary code pulses are conventionally decoded. Fig. 5 shows receiver apparatus which evaluates incoming reflected binary code pulse groups directly in accordance with the Formula 4 into message signal samples, without resort to the intermediate translation process from code to code. Referring first to Fig. 3, the incoming reflected binary code signal, after such preliminary demodulation and amplification as may be required, appears at the input terminals of the receiver proper, schematically indicated by a broken line 41 as reflected binary code pulses. For best results they are preferably regenerated, for example, by a gater-slicer circuit 42 of any suitable type, whereupon they are routed to one or more translating networks, the number being dependent on the rapidity with which such translating networks may act. Thus, in Fig. 3, two such networks are employed and the regenerated pulses are applied to them in parallel by way of coupling condensers 43, 44. Each translating network may comprise a so-called "flip-flop" circuit, namely, a pair of triodes 45, 46 in which the anode of each is connected by a direct current path to the control grid of the other. Appropriate operating biases may be applied to the control grids by way of voltage dividers. Thus the control grid of tube 46 receives its bias from a source 51 by way of resistors 47, 48, and is returned to the negative terminal of this source by way of resistors 49, 50. Such a circuit has two stable rest conditions, in each of which one tube is conductive while the other is not. On the application of a pulse to the grids of both tubes, the condition is reversed, and remains reversed until the application of the next pulse, whereupon it returns again to the first condition. Thus, for an incoming pulse wave form as indicated at A, the output wave form, namely, the wave form of the potential of the anode of the right-hand tube 46 is as indicated at B.

For reasons which will be explained below, it is preferred to restore the flip-flop circuit 45, 46 to its initial condition at the conclusion of each pulse group. To this end the control grid of the right-hand tube 46 is supplied with a positive voltage pulse, derived, for example, from a battery 52, at the pulse group frequency, by way of a commutator or distributor 53 which is driven at the appropriate speed. The distributor may be of any suitable type, preferably electronic. A particularly suitable system for obtaining the distributor driving pulse rate from the incoming pulse train is described and shown in the Bell System Technical Journal publications above referred to and is claimed in an application of J. G. Kreer and E. Peterson, Serial No. 776,280, filed September 26, 1947, now Patent 2,527,638, issued October 31, 1950. In brief the system there disclosed comprises a differentiating circuit 54, a rectifier 55, a band-pass filter 56 tuned to the basic pulse frequency and a pulse shaper 57 in tandem. As fully described in that application, this arrangement of apparatus reproduces the basic pulse frequency of the transmitter pulse generator 26. This pulse frequency may operate a frequency divider 58 of which the frequency ratio is equal to the number of digits of the code. Thus, with the 7-digit code, the frequency divider should produce output pulses whose frequency is one-seventh of the frequency of the basic timing source. A step-down multivibrator is a suitable instrument for the purpose. Its output pulses are next squared and standardized in form by a shaper circuit whose output, in turn, operates the distributor. In the symbolic representation of the figure, the contact arm rotates at one half the rate of the driving group frequency pulses.

Application of the positive voltage of the battery 52 to the control grids of the tubes 46, 46' of the two flip-flop circuits in sequence by the distributor 53 returns each flip-flop circuit to its initial condition at the conclusion of the pulse group which it has just translated and holds it in this condition until, after one pulse group period, the voltage is removed by movement of the rotating arm 60 of the distributor to the opposite segment. Thereupon the positive voltage rapidly leaks off to ground by way of the various resistors connected to the grid of the flip-flop circuit. Thus, the two flip-flop circuits are enabled in alternation, one being disabled while the other is enabled. Furthermore, each is returned to its initial condition at the instant it is disabled, thus preparing it to receive a later pulse group.

In order that the alternate enabling and disabling of the flip-flop circuits shall take place between successive incoming code pulse groups, and that each flip-flop circuit shall receive an entire group, and not portions of two groups, the phase of the movement of the distributor arm 60 must be correct, as well as its speed. Its phase may conveniently be controlled by inclusion of an adjustable phase shifter 61 in the distributor control path. As this device is adjusted continuously, a position will be found at which the reproducer output is intelligible. For other positions it is unintelligible because each flip-flop circuit will be translating incomplete portions of two code groups. The adjustable phase shifter 61 is thus, in effect, a framing controller. Other more elaborate framing means may, of course, be employed if preferred.

The output voltage of each of the flip-flop circuits 46, 46' is next gated at the basic pulse frequency by a regenerator 62, 62' which may again be similar to that described in the aforementioned application of L. A. Meacham. The two regenerators operating respectively on the output pulses of the two flip-flop circuits may be supplied with control gating pulses at the basic pulse frequency by way of a conductor 63.

The resulting wave form at the output terminals of the regenerator is indicated at C. Comparison of the Formulae 1 with the foregoing operations will reveal that this wave is now in the form of the conventional binary pulse code, and it may therefore be translated into signal samples for application to a reproducer 64 by decoders 65, 65', whose outputs are collected turn and turn about by a distributor 66, driven in synchronism with the distributor 63.

Suitable decoder apparatus is described in Goodall Patent 2,449,467, issued September 14, 1948.

It is the function and purpose of the flip-flop circuits of Fig. 3 to produce a change in an output circuit in a specified direction on the arrival of the first pulse of an incoming reflected binary code pulse group; to remain quiescent until the arrival of the next pulse and thereupon to produce a change in the opposite direction; to remain quiescent again until the arrival of the third pulse and thereupon to produce a change in the first direction, and so on. Other apparatus than the flip-flop circuit is possible, and Fig. 4 shows an alternative to the system of Fig. 3 in which this function is performed by the combination of a rectifier circuit and a specially constructed cathode ray tube. The incoming reflected binary pulse code group, which again may have the wave form shown at A, is applied to a network comprising a condenser 70, a diode rectifier 71 and a constant current device such as a saturated pentode amplifier 72. As is well known such a circuit operates in the manner of a "pail and dipper" circuit supplying standard increments of charge through the condenser 70 upon the arrival of each pulse of the incoming pulse code group. Therefore the condenser voltage rises in substantially equal steps, one step for each incoming pulse. The condenser wave form is indicated at B.

This stepped condenser wave form is then applied to vertical deflecting elements 73 of a cathode beam tube 74 which may comprise an electron gun 75 and a collector anode 76 of conventional type and having interposed in the path of the cathode beam 77 between the electron gun 75 and the collector anode 76, a mask 78 of special configuration. This mask comprises a vertical array of apertures, each separated from its neighbors by a distance equal to the aperture height. For a 7-digit code, four apertures are required, separated by three spaces. Deflection bias means, such as an adjustable battery-potentiometer combination 79 is included in the circuit of the vertical deflection elements 73 and is adjusted so that the undeflected beam position lies on the mask 78 just below the first aperture. The sensitivity of the tube 74 for beam deflections is adjusted in any desired manner so that a change of one step in the voltage of the condenser 70 moves the beam 77 upward along the mask 78 from its rest position to approximately the center of the first aperture, while the next step moves it to the blank portion of the mask which separates the first aperture from the second, and so on, each voltage step moving it from a blank space to an aperture or from an aperture to a blank space. With this construction, voltage pulses appear in the circuit of the collector anode 76 and across the output loading resistor which have the characteristics of the curve C, namely, a voltage change in one direction for the first pulse and a like change in the opposite direction for the next pulse, and so on.

To allow time for the pail and dipper circuit to return to its initial condition, and for the cathode beam of the translating tube to return to its initial position at the foot of the translating mask, two like systems of pail and dipper circuit and translating tube are provided. Also pulses of all pulse code groups may be applied to both systems in parallel while pulses of code group frequency, derived in the manner described above in connection with Fig. 3, are applied from a battery 52 by way of a distributor 53 to a restoring and disabling circuit comprising a triode 81 whose anode and cathode are connected across the condenser 70 of the pail and dipper circuit, while its control grid is pulsed positively by the output of the distributor 53. Thus, application of a positive pulse, for example, to the upper triode makes the latter highly conductive so that its "pail" condenser 70 cannot hold any substantial charge. Under these conditions, application of incoming code group pulses to the upper pail and dipper circuit are ineffective to deflect the cathode beam 77 of the upper translating tube 74. During this time, however, the lower triode 81' is held well below cut-off by grid rectification due to the grid condenser 82' and resistor 83' in combination so that application of incoming code pulses to the lower pail and dipper circuit 70', 71', 72', results in stepping the condenser voltage by equal negative steps and therefore deflecting the cathode beam of the lower translating tube 74' along the translating mask in the manner described above. At the termination of this code group, the rotating arm 60 of the distributor 53 makes contact with the lower distributor segment and opens the circuit from the battery 52 to the upper distributor segment. Thus the upper pail and dipper circuit 70, 71, 72 is enabled while the lower pail and dipper circuit is returned to its initial condition and disabled.

The resulting translated pulse code groups may now be supplied to individual regenerating circuits and decoders in the manner described above in connection with Fig. 3. Alternatively, they may be applied in alternating sequence to a single regenerator 85, to which gating pulses are applied at the basic pulse frequency by way of a conductor 86 and thence to a decoder 87 which may be of any suitable type and serves to translate the resulting sequence of conventional binary pulse code groups into a message for reproduction in a reproducer 88.

In the Formulae 1, each digit of the translated conventional binary code is determined in part by the most significant digit of the reflected binary code, e. g., $C_6$, $C_5$, $C_4$, $C_3$, $C_2$, $C_1$ are all determined in part by $R_7$. By the same token, the apparatus of Figs. 3 and 4, which carry out the operations required by these formulae, is unable to translate correctly until the most significant reflected binary code pulse of each group is at hand. To avoid complexity of apparatus, therefore, it is preferred, when translating from reflected binary code to conventional binary code, that the most significant digit pulse of each group be the earliest received, and the least significant the last. It is for this reason that, at the transmitter, the coding mask of Fig. 2 is oriented with respect to the cathode beam sweep so that the beam crosses the seventh aperture column first in the course of its sweep and the first column last.

Fig. 5 shows a system for translating incoming reflected binary code pulse groups directly into message signal samples without first translating them into conventional binary code pulse groups as an intermediate step. This system requires no restoration of the translator circuit to its initial condition at the conclusion of a code pulse group and therefore a single translator circuit may be employed. Incoming reflected binary code pulses appear on the incoming line as before and, after being regenerated, are applied to a flip-flop circuit which is similar to that of Fig. 3, except that the group frequency pulsing conductor which restores the flip-flop circuit of Fig. 3 to its initial condition at the conclusion of a code group is omitted. The incoming pulses A are applied to the grids of both tubes 90, 91 together and the output voltage is taken from the anode of one tube 91, just as before. The output voltage, therefore, has the wave form of the curve B if, prior to the first pulse of the group, the right-hand tube 91 was conductive; i. e., if the initial condition of the circuit was the same as the initial condition of the flip-flop circuit of Fig. 3.

On the other hand, if at the commencement of the pulse code group A, the initial condition of the flip-flop circuit were the reverse, namely, that the left-hand tube 90 was conductive, then the output wave form would be inverted with respect to the wave form, curve B.

The output voltage of this flip-flop circuit is next differentiated, for example by a combination of a condenser 92 and a resistor 93 or by any desired differentiating circuit, to give a sequence of positive and negative pulses having the form of the curve C. This pulse sequence is in turn shaped, by any suitable means, schematically indicated by the block 94, to give substantially rectangular waves as in the curve D. It will be observed that pulses of this curve D are substantially identical with those of the incoming reflected binary code pulses with the exception of the fact that alternate pulses are inverted in polarity.

This pulse sequence is now applied to a group of delay devices 95*a*, 95*b*, etc. in number one less than the number of digits of the code, in parallel. The output terminals of these delay devices are in turn connected to individual attenuators 96*a*, 96*b*, etc. whose conductances are proportional to the numbers 1, 3, 7, 15, 31 and 127. The outputs of these attenuators are paralleled and applied to the input terminals of an amplifier, preferably a voltage feedback amplifier which may comprise a triode 97 whose control grid is connected to its anode by way of a conductance 98 of magnitude equal to the magnitude of the smallest conductance 96*g*. The output of the triode 97 is sampled at the pulse group rate by a sampler 99 which may be supplied with control pulses derived from the incoming pulse sequence by a differentiator 54, a rectifier 55, a band-pass filter 56, a pulse shaper 57, a 7 to 1 frequency divider, such as a step-down multi-vibrator 58 and a pulse shaper 59 connected in tandem in the manner explained above in connection with Fig. 3.

The sampled output is in turn rectified by a rectifier 100 and applied in the form of message samples to a reproducer 101.

The operation of this translating circuit is as follows: Pulses of the form D are applied to all of the delay devices 95*a*, 95*b*, etc. in parallel. The delays of these devices differ from each other by precisely a single pulse period. Thus at their output terminals all the pulses of a single pulse group occur in time coincidence. Because of the alternate reversal of polarity of the pulses of the wave D, some of them are positive and others negative as required by the Formulae 4. The various resistors 96*a*, 96*b*, etc. now effectively multiply the magnitudes of these various pulses by numbers of the series 1, 3, 7, 15, 31, 63 and 127, as indicated by the Formulae 4, without altering the fact that alternate pulses are negative in sign. The outputs of these resistors are now effectively added by the voltage feedback amplifier 97, again as required by Formulae 4. In view of the alternating signs of the pulses of the wave D, this addition is algebraic. Therefore, the results of the addition may be positive or negative, in dependence on whether the pulse of greatest digital significance is positive or negative. However, negative sums are converted to positive sums by the rectifier 100, while positive sums are unaltered by the rectifier 100. The result is a sequence of pulses which recur at the pulse group rate. They are in fact proportional to the samples of the original message signal and can therefore be applied without further change to a reproducer 101.

An adjustable phase shifter 61 is included in the gating pulse conductor which brings group frequency pulses to the sampler 99. As this device is adjusted continuously a position will be found at which the output of the reproducer is intelligible. For other positions it will be unintelligible because the sampling pulse occurs at an instant at which the pulses of a single pulse code group, brought into time coincidence by the respective delay devices 95*a*, 95*b*, etc., are not present in the amplifier output.

In contradistinction to the code-to-code translators of Figs. 3 and 4, the direct translator of Fig. 5 is, with a small modification, equally well adapted to receive and translate reflected code pulses in which the first pulse of each group to arrive is the pulse of least digital significance and the last to arrive is the pulse of greatest digital significance. This would be the arrival order, if, in Fig. 1, either the direction of sweep of the cathode beam 11 or the columnar arrangement of the coding mask 15 were reversed. To rearrange the apparatus of Fig. 5 to receive reflected binary code pulses in the reverse order of their digital significance and translate them into message signal samples, it is only necessary to interchange the delay times with respect to the numerical weightings; e. g., connect the longest delay device 95 to the lowest conductance 96, the next longest delay to the next lowest conductance, and so on, finally connecting the shortest or zero delay to the highest conductance. No other change is necessary, and the operation is otherwise just as described above.

What is claimed is:

1. In a pulse code communication system, means for translating signal samples into reflected binary code groups of on-or-off pulses, means for transmitting pulse groups to a receiver station, means at said receiver station for converting each received group of said pulses into a conventional binary code pulse group, and means for translating said conventional binary code pulse groups into message signal samples.

2. Receiver apparatus for translating an incoming sequence of code pulse groups in each of which pulses are arranged in accordance with the reflected binary code, which comprises means for projecting a cathode beam, a collector for electrons of the beam, a mask having a plurality of similar apertures in the path of the beam, non-apertured portions of the mask between the apertures being of dimensions equal to the dimensions of the apertures, bias means for adjusting the undeflected position of the beam to a non-apertured portion of the mask beyond the first aperture, means for deflecting the beam along the mask in steps equal to one half the aperture pitch under control of successive pulses of one incoming reflected binary code pulse group, means for restoring the beam to its undeflected position at the conclusion of each pulse group, connections for withdrawing from the collector a current due to passage of the beam through the apertures of the mask, which current is a sequence of pulses arranged in the conventional binary code, and means for translating said conventional binary code pulse groups into message signal samples.

3. Receiver apparatus for translating an incoming sequence of code pulse groups in each of which pulses are arranged in accordance with the reflected binary code, which comprises means for reversing alternate ones of the pulses of said sequence to form a derived pulse sequence, a plurality of delay devices having delay times related to the several pulse positions of a code group, connections for applying pulses of the derived sequence to said delay devices, whereby they are brought into time coincidence, means for selectively amplifying the outputs of said delay devices in proportion to the numbers 1, 3, 7, 15, 31, 63, 127 . . . $2^n-1$, where $n$ is the number of code digits, means for adding the resulting amplified pulses, means for sampling the added pulses at instants following the completion of each code pulse group, means for rectifying the resulting samples, a message reproducer, and means for supplying said rectified samples to said reproducer.

4. The method of translating an incoming sequence of code pulse groups in each of which pulses are arranged in accordance with the reflected binary code, which comprises reversing alternate ones of the pulses of said sequence to form a derived pulse sequence, relatively delaying the pulses of the derived sequence by times related to the several pulse positions of a code group whereby said pulses are brought into time coincidence, selectively amplifying the pulses thus delayed in proportion to the numbers 1, 3, 7, 15, 31, 63, 127 . . . $2^n-1$, where $n$ is the number of code digits, adding the resulting amplified pulses, sampling the added pulses at instants following the completion of each code pulse group, rectifying the resulting samples, and reproducing the succession of rectified samples as a message.

5. Receiver apparatus for translating an incoming sequence of code pulse groups in each of which pulses are arranged in accordance with the reflected binary code, which comprises a circuit arrangement adapted to deliver an intermediate signal of one magnitude upon the application to it of odd numbered pulses and a signal of another magnitude on the application to it of even numbered pulses, means for producing a positive pulse for each change of said intermediate signal in one direction and a negative pulse for each change of said output signal in the other direction, a plurality of delay devices having delay times related to the several pulse positions of a code group, connections for applying pulses of the last-named pulse sequence to said delay devices whereby said pulses are brought into time coincidence, means for selectively amplifying the outputs of said delay devices in proportion to the numbers 1, 3, 7, 15, 31, 63, 127 . . . $2^n-1$, where $n$ is the number of code digits, means for adding the resulting amplified pulses, means for sampling the added pulses at instants following the completion of each code pulse group, means for rectifying the resulting samples, a message reproducer, and means for supplying said rectified samples to said reproducer.

6. The method of translating an incoming sequence of code pulse groups in each of which pulses are arranged in accordance with the reflected binary code, which comprises producing an intermediate signal of one magnitude upon the application of odd numbered pulses and a signal of another magnitude on the application to it of even numbered pulses, producing a positive pulse for each change of said intermediate signal in one direction and a negative pulse for each change of said intermediate signal in the other direction, relatively delaying the various pulses of a group by times related to the several pulse positions of a code group, whereby said pulses are brought into time coincidence, selectively amplifying the variously delayed pulses in proportion to the numbers 1, 3, 7, 15, 31, 63, 127 . . . $2^n-1$, where $n$ is the number of code digits, adding the resulting amplified pulses, sampling the added pulses at instants following the completion of each code pulse group, rectifying the resulting samples, and reproducing the succession of rectified samples as a message.

7. Apparatus for translating each of a succession of signal amplitude samples into a reflected binary code pulse group, which comprises means for projecting a cathode beam, a mask having a plurality of apertures arranged in rows and columns in the path of said beam, said apertures being so distributed among said rows and columns that each row differs by only one aperture in one column from each adjacent row, elements for deflecting the beam to a selected aperture row under control of a signal sample to be coded, and means for deriving pulses from passage of the beam electrons through the several apertures of the selected row.

8. Apparatus for translating each of a succession of signal amplitude samples into a reflected binary code pulse group which comprises means for projecting a cathode beam, a mask having a plurality of rows of apertures in the path of said beam, elements for deflecting the beam to a selected aperture row under control of a signal sample to be coded, and means for deriving current pulses from passage of the beam electrons through the several apertures of the selected row, the apertures of said mask being arranged in a plurality $n$ of columns and a plurality $2^n$ of rows, where $n$ is the number of digits in the code, columns which are adjacent as measured from one side of the mask having successively greater digital significance, the apertures of each column being spaced apart along the column by distances equal to their widths in the same direction, the apertures of each column except the column of greatest digital significance being twice as high, measured along the column, as the apertures of the adjacent column of lower digital significance and being centrally located adjacent the two ends of the apertures of the adjacent column of next higher digital significance, the resulting array of apertures, apart from the single aperture of the column of greatest digital significance, being symmetrical about a transverse center line parallel with the rows, the single aperture of the column of greatest digital significance filling that half of said column which lies to one side of said center line.

9. Apparatus for translating each of a succession of signal amplitude samples into a reflected binary code pulse group which comprises means for projecting a cathode beam, a mask having a plurality of rows of apertures in the path of said beam, elements for deflecting the beam to a selected aperture row under control of a signal sample to be coded, and means for deriving current pulses from passage of the beam electrons through the several apertures of the selected row, the apertures of said mask being arranged in a plurality $n$ of columns and a plurality $2^n$ of rows, where $n$ is the number of digits in the code, each column corresponding to a particular digit of the code, the aperture pattern being such that, with the exception of the two columns of first and second digital significance, the apertures of each column are spaced apart along the column by distances equal to their heights in the same direction, and are twice as high, measured along the column, as the apertures of that column which corresponds to the digit of next lower significance, and are centrally juxtaposed with the two ends of the apertures of that column which corresponds to the digit of the next higher significance, the columns of first and second digital significance each containing a single aperture, the resulting array of apertures, apart from the single aperture of the column of first digital significance, being symmetrical about a transverse center line parallel with the rows, the single aperture of the column of first digital significance filling that half of said column which lies to one side of said center line.

10. In a pulse code communication system, means for translating successive amplitudes of a message into binary code groups of on-or-off pulses including means whereby the characteristics of said code groups are such that each permissible pulse position in a code pulse group is uniquely correlated with a particular digit of the code, the code value of each "on"-pulse being proportional to $(-1)^s(2^{d-1})$ where $d$ is the digit number of the digit with which the pulse position occupied by said "on"-pulse is correlated and $s$ is the number of "on"-pulses in said code pulse group having digit numbers greater than $d$, the code value of each "off"-pulse being zero, the code value of each entire pulse group being the sum of the individual code values of the several pulses of said group, and means for converting each group of said pulses into a conventional binary code pulse group.

11. In a pulse code system as defined in the preceding claim, wherein the converting means comprises means to deliver an output signal of one magnitude prior to the application to it of the first of a sequence of input pulses and after the application of an even number of pulses, and a signal of another magnitude upon the application of the first or any odd numbers of pulses, means for restoring said circuit to its initial condition after the expiration of a pulse group period.

12. In a pulse code communication system, means for translating signal samples into reflected binary code groups of on-or-off pulses, means for thereafter converting each pulse group of said pulses into a conventional binary code pulse group, and means for translating each of said conventional binary code pulse groups into a message signal sample.

13. In a pulse code communication system, means for translating successive amplitude samples of a message into binary code groups of on-or-off pulses including means whereby the characteristics of said code groups are such that each permissible pulse position in a code pulse group is uniquely correlated with a particular digit of the code, the code value of each "on"-pulse being proportional to $(-1)^s(2^{d-1})$ where $d$ is the digit number of the digit with which the pulse position occupied by said "on"-pulse is correlated and $s$ is the number of "on"-pulses in said code pulse group having digit numbers greater than $d$, the code value of each "off"-pulse being zero, the code value of each entire pulse group being the sum of the individual code values of the several pulses of said group, and means for decoding each group of said pulses into a message signal amplitude.

14. Apparatus as defined in claim 13 wherein the decoding means comprises means for inverting the polarity of alternate "on"-pulses of each received group of pulses arranged in accordance with said code, means for weighting the individual on-or-off pulses of said group in the ratios $2^n-1, \ldots 7, 3, 1$, means for adding the pulses so weighted to provide sums, a reproducer, and means for applying the sums to the reproducer.

15. The method of translating an incoming sequence of code pulse groups in each of which pulses are arranged in accordance with the reflected binary code, which comprises reversing alternate ones of the pulses of said sequence to form a derived pulse sequence, selectively amplifying the pulses of said derived sequence in proportion to the numbers 1, 3, 7, 15, 31, 63, 127 . . . $2^n-1$, where $n$ is the number of code digits, adding the resulting amplified pulses, sampling the added pulses at instants following the completion of each code pulse group, rectifying the resulting samples, and reproducing the succession of rectified samples as a message.

16. The method of translating an incoming sequence of code pulse groups in each of which pulses are arranged in accordance with the reflected binary code, which comprises producing, for each incoming pulse group, an intermediate signal of one magnitude prior to the application of the first pulse of each group and after the application of an even number of pulses, and a signal of another magnitude upon the application of the first or any odd number of pulses, and thereafter converting each group of such intermediate signal pulses into a message amplitude sample.

FRANK GRAY.

REFERENCES CITED

The following references are of record in the file of this patent:

UNITED STATES PATENTS

| Number | Name | Date |
|---|---|---|
| 2,207,744 | Larson | July 16, 1940 |
| 2,272,070 | Reeves | Feb. 3, 1942 |
| 2,437,707 | Pierce | Mar. 16, 1948 |
| 2,438,487 | Goodall | Apr. 6, 1948 |
| 2,453,461 | Schelleng | Nov. 9, 1948 |
| 2,458,652 | Sears | Jan. 11, 1949 |
| 2,489,883 | Hecht | Nov. 29, 1949 |

FOREIGN PATENTS

| Number | Country | Date |
|---|---|---|
| 344,444 | Great Britain | Feb. 7, 1931 |
| 582,177 | Great Britain | Nov. 7, 1946 |

OTHER REFERENCES

Fiat Final Report 865, pages 40–57, August 19, 1946.